United States Patent Office 3,776,875
Patented Dec. 4, 1973

3,776,875
PREPARATION OF MODIFIED ORGANOPOLY-
SILOXANES IN A SOLVENT SYSTEM
John Charles Getson, Tecumseh, Mich., assignor to
Stauffer Chemical Company, New York, N.Y.
Continuation of abandoned application Ser. No. 713,203,
Mar. 14, 1968. This application Dec. 30, 1971, Ser.
No. 214,405
Int. Cl. C08f 11/04
U.S. Cl. 260—31.2 R                15 Claims

ABSTRACT OF THE DISCLOSURE

Thixotropic curable compositions with self-priming properties are prepared by grafting hydroxyl-terminated organopolysiloxanes with unsaturated organic monomers in the presence of inert organic solvents.

---

Figure 1:
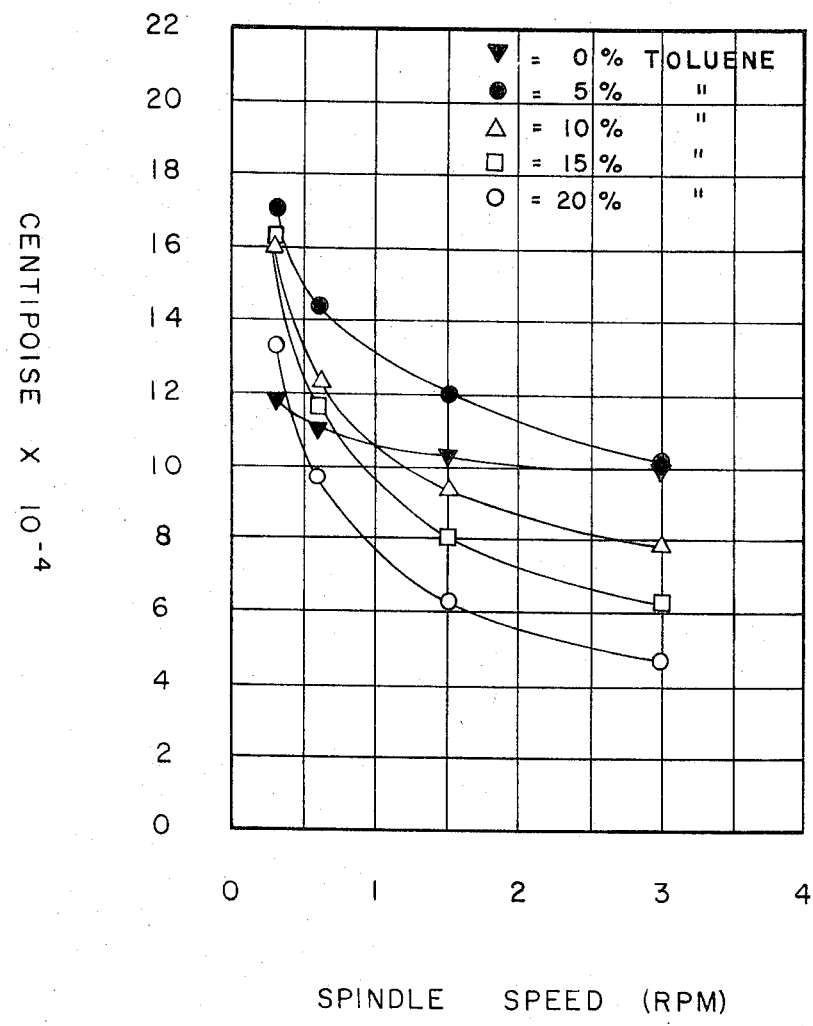

This application is a continuation of application Ser. No. 713,203, filed Mar. 14, 1968, now abandoned.

This invention relates to modified organopolysiloxanes, particularly to modified organopolysiloxanes prepared in a solvent system which have thixotropic properties. These modified organopolysiloxanes are further modified to form room-temperature-curable organopolysiloxanes having self-priming properties.

Heretofore, organopolysiloxanes have found wide industrial applications because of their thermal stability, dielectric properties, and resistance to atmospheric deterioration. It was found in some applications that it was desirable to have improved physical properties, for example, improved tensile strength, elongation, and tear strength. In order to improve upon these physical properties various reinforcing agents and fillers have been incorporated therein. However, these fillers or reinforcing agents have not improved the tensile strength, tear strength and elongation values to the point where these values approach physical properties of other synthetic and natural rubbers.

It is known that organopolysiloxanes which contain particles generated in situ produce stable systems and provide desirable properties. The particulate matter may be generated in these systems by reacting monomers with organopolysiloxanes under carefully controlled reaction conditions in the absence of a solvent. The reaction is, however, exothermic, and the enormous temperature build-up makes it extremely difficult to control in large-volume batch reactors. Consequently, heretofore only a limited number of modified organopolysiloxanes could be prepared in large-volume reactors.

In addition, where room-temperature-curable organopolysiloxanes are used as sealants, it was necessary to incorporate fillers therein to provide a composition having desirable properties and consistency. However, since filled modified organopolysiloxanes do not adhere to unprimed substrates, it was necessary first to treat the substrate with a primer prior to the application of the filled curable organopolysiloxane in order to obtain satisfactory adhesion to the substrate. In addition, many primers are effective on some substrates while ineffective on others, i.e., metal primers are not always good wood primers, and steel primers are not necessarily good aluminum primers and vice versa.

Therefore, it is an object of this invention to provide modified organopolysiloxanes having thixotropic properties. Another object of this invention is to provide room-temperature-curable modified organopolysiloxanes which will adhere to unprimed substrates. Still another object of this invention is to provide a self-priming modified room-temperature-curable organopolysiloxane containing particulate matter. A further object of this invention is to provide a controllable method for preparing modified room-temperature - curable organopolysiloxanes having self-priming properties.

The foregoing objects and others which will become apparent from the following description are accomplished in accordance with this invention, generally speaking, by providing a method for preparing thixotropic modified organopolysiloxanes containing particulate matter in a solvent system. These modified organopolysiloxanes are prepared by contacting an organopolysiloxane with an organic monomer or mixture of monomers in the presence of an organic solvent and a free-radical initiator, thereby providing for grafting and in situ generation of particulate matter.

Specifically, the present invention provides a method for preparing modified organopolysiloxanes having improved physical properties by controlling the amount of organic solvent present during graft polymerization.

FIG. 1 illustrates the thixotropic properties of a modified organopolysiloxane prepared in a solvent system versus a modified organopolysiloxane prepared in the absence of a solvent.

In accordance with the method of this invention, olefinic monomers may be grafted to organopolysiloxanes in the presence of a free-radical initiator and an organic solvent to form modified organopolysiloxanes of the general formula:

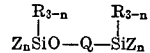

wherein the R's, which may be the same or different, represent monovalent hydrocarbon radicals; Q represents a siloxane radical of the formula:

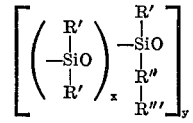

wherein the R"s, which may be the same or different, represent monovalent hydrocarbon radicals, halogenated monovalent hydrocarbon radicals or cyanoalkyl radicals; R" is a divalent hydrocarbon radical; R''' is a polymeric organic radical linked to R" by a carbon-to-carbon linkage; Z is a functional group which may be hydrolyzable or condensable, such as hydrogen, hydroxyl, amino, amido, aminooxy, oximo, halogen, aryloxy, acyloxy, alkoxy, or phosphato groups; $n$ is an integer of from 1 to 3; $x$ is an integer of from 0 to 20,000; and $y$ is an integer of from 1 to 500.

The organopolysiloxanes used in the grafting step may be represented by the formula:

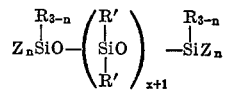

wherein R, R', Z, $n$, and $x$ are the same as those described above. In the above formula, R and R', which may be the same or different, represent organic radicals, such as alkyl radicals, e.g., methyl, ethyl, propyl, and butyl radicals; and aryl radicals, e.g., phenyl, tolyl, and chlorophenyl.

Generally, the modified organopolysiloxanes consist of an organosiloxane polymer having attached thereto one or more side chains or branches consisting of a carbon-chain polymer. In preparing these compositions, hydrogen is abstracted from the organosiloxane polymer by free-radical initiators to form an active site for grafting the organic polymer thereto. The term grafting, as used here, is meant to include the preparation of compositions in which some or all of the organic polymer is connected to the siloxane polymer by a carbon-to-carbon linkage.

Any organosiloxane polymer capable of forming free radicals or active sites may be used in the grafting step. Thus, the polymer should be one which is capable of forming free radicals by hydrogen abstraction and should be substantially free of any tendency to undergo further polymerization under the conditions employed. Thus, the siloxane polymer should be one which is substantially free of any aliphatic unsaturation; however, a low degree of any such unsaturation does not preclude the desired reaction even though it may set up a competitive reaction which is usually preferably avoided. It is preferred that the organopolysiloxane have lower alkyl radicals attached to the silicon atoms since these are more amenable to hydrogen abstraction than other radicals.

Examples of suitable organosiloxane polymers and copolymers which may be used in the formation of the modified polymers are hydroxyl-terminated siloxane fluids, such as methylphenyl silicone fluids, copolymers of dimethylsiloxane, and methyl-, phenyl-, or diphenylsiloxane units.

In addition, the organosiloxane polymers may be in the form of partially condensed and completely condensed polysiloxanes. Examples of completely condensed polysiloxanes are hexamethyldisiloxanes; cyclic siloxanes, such as octamethylcyclotetrasiloxane and trimethylsiloxy-end-blocked polymers of dimethylsiloxanes.

Any polymerizable organic monomer having aliphatic unsaturation may be grafted to the organosiloxane polymer. Examples of suitable olefinic compounds are low molecular weight straight-chain hydrocarbons, such as ethylene, propylene, butylene; vinyl halides, such as vinyl fluoride and vinyl chloride; vinyl esters, such as vinyl acetate, styrene, ring-substituted styrenes, and other aromatics, such as vinylpyridine and vinylnaphthalene; acrylic acid and derivatives of acrylic acid, including the salts, esters, amides, and acrylonitrile; N-vinyl compounds, such as N-vinylcarbazole, N-vinylpyrrolidone, and N-vinylcaprolactum; and vinylsilicon compounds, such as vinyltriethoxysilane.

Disubstituted ethylenes of the type $CH_2=CX_2$ may be used, including vinylidene fluoride, vinylidene chloride, vinylidene cyanide, methacrylic acid, and compounds derived therefrom, such as the salts, esters, and amides as well as methacrolein, methacrylonitrile, and the like.

Examples of disubstituted ethylenes of the type $$CHX=CHX,$$

such as vinylene carbonate and various monomers which polymerize best in the presence of other monomers, e.g., maleic anhydride, esters of maleic and fumaric acids, stilbene, indene, and coumarone, may be used in the formation of these modified polymers.

As before emphasized, the monomers may be used singly or in combinations of two or three or even more. The properties of the modified product, of course, depend upon the nature and identity of the monomeric materials as well as on the amounts used relative to the organosiloxane polymer. Monomers that give elastomeric homopolymers generally provide elastomeric modified products while those that give plastic homopolymers tend to yield modified products which are less elastic. By using at least one monomer from each class, modified products can be obtained meeting the requirements which the prior compositions cannot approach.

In preparing the modified organopolysiloxanes of this invention, the grafting operation is most expeditiously effected by using free-radical initiators, normally organic peroxides, although azo-compounds may be used in which both the nitrogen atoms of the azo linkage are attached to a tertiary carbon atom, and the remaining valences of the tertiary carbon atom are satisfied by nitrile, carboxyl, alkyl, cycloalkylene, or alkyl radicals, preferably having from 1 to 18 carbon atoms. In addition to the above mentioned initiators, ionizing radiation may also be used to bring about the formation of free radicals.

The most suitable peroxide initiators are compounds of the formula ROOH, ROOR, or RCOOOR in which R is an organic radical. Specific examples of peroxides which are operative in this invention are hydroperoxides, such as t-butyl hydroperoxide, cumene hydroperoxide, and Decalin hydroperoxide; dialkyl peroxides, such as di-t-butyl and dicumyl peroxide; cyclic peroxides, such as ascaridole and 1,5-dimethylhexane-1,5-peroxide; peresters, such as t-butyl perbenzoate, t-butylperoxy isopropyl carbonate, and t-butyl peroctoate; keto peroxides, such as acetone peroxide and cyclohexanone peroxide.

Acyl peroxides and peracids may be used in the practice of this invention, but in general they result in less grafting, i.e., poor yields of the grafted product.

The amount of free-radical initiator used is not critical; thus any amount capable of producing a perceptible degree of grafting is suitable. Generally, as little as 0.05 percent of the more active peroxide initiators based on the weight of the monomer is adequate in most cases. However, where it is desirable to increase the reaction rate, then as much as 3 percent or even more of the initiator may be used. As a general rule, it is advisable not to exceed about 5 percent concentration, since higher concentrations tend to promote cross-linking and thus cause an undesirable increase in the viscosity of the reaction mixture.

It has been discovered that even the most reactive monomers may be used in the formation of modified organopolysiloxanes having particulate matter therein by conducting the grafting step in the presence of a critical amount of organic solvent.

The amount of solvent should be within the range of from about 2 to about 50 percent, preferably from about 5 to 30 percent by weight of the composition, i.e., solvent and reactants. Where the amount of organic solvent is greater than about 50 percent of the total weight of the composition, the modified siloxanes, when cured, have properties similar to those of the organic phase rather than the siloxane phase, which indicates that there has been an inversion of the phase relationship. This is to be avoided since an inversion of this type is detrimental to the strength of the system.

In addition, an organic solvent provides a means for controlling the temperature during the grafting step, thereby decreasing the possibility of runaway reactions. Where a reasonably volatile solvent is used, preferably a solvent which boils at substantially the same temperature as the grafting temperature, it provides a means for controlling the reaction and thereby controlling the exothermic reaction. Now, it is possible to prepare compounds which heretofore were impossible to prepare on a commerical scale. Also, the presence of a solvent will provide a liquid-phase system, particularly where volatile or gaseous monomers are employed and thus provide a substantial reduction in the grafting time with a substantial increase in the formation of modified organopolysiloxane polymers.

Any organic solvent boiling within the range of about 50° to 160° C. and having a relatively low chain-transfer constant may be used in the grafting operation. Suitable solvents are aromatic hydrocarbons, such as benzene, toluene, xylene; chlorinated aromatic hydrocarbons, such as chlorobenzene; aliphatic hydrocarbons, such as pentane, hexane, octane; cycloaliphatic hydrocarbons, such as 1,1-dimethylcyclopentane, cyclohexane, 1,1-dimethylcyclohexane, cycloheptane, cyclooctane, and the like. Esters such as methyl acetate, ethyl acetate, propyl acetate, butyl acetate, amyl acetate, isoamyl acetate, methyl propionate, methyl butyrate, ethyl butyrate, methyl valerate, methyl trimethyl acetate, methyl caproate, ethyl valerate, ethyl trimethyl acetate, and the like may also be used as solvents.

The proportion of organosiloxane used in the grafting step may be varied within wide limits. However, it is found that optimum physical properties are obtained when the siloxane comprises from 25 to 60 percent of the reactants, not including the solvent. Higher proportions may be used, but the properties of the resulting modified siloxane are inferior. When the siloxane content is below about 25 percent of the reactants, the organic polymer becomes a continuous phase, and a semisolid product may result. Even though the proportion of organosiloxane polymer may be below about 25 percent by weight based on the weight of the reactants, it is preferred that the organosiloxane concentration be from about 25 to about 50 percent of the reactants.

The viscosity of the organosiloxane polymer used in preparing the modified organopolysiloxanes has a profound effect on the physical properties of the polymers. Even through the viscosity of the organopolysiloxane fluid used in grafting step may vary over a wide range, it is preferred that the viscosity of the fluid be from about 100 to about 20,000 cs. at 25° C., preferably from about 250 to 10,000 cs.

An advantage of the solvent system over the non-solvent system is the formation of a modified material having thixotropic properties. This property is illustrated in a solvent concentration of from about 2 to 50 percent of the total weight. Also, it was found that the thixotropic properties are a function of the solvent concentration in the system. In other words, an increase in solvent concentration results in an increase in thixotropy.

The thixotropic modified organopolysiloxanes prepared according to the present invention are especially advantageous in the sealant area, since the amount of filler needed to make a nonslumping sealant is reduced.

The modified organopolysiloxanes may be used in room-temperature-curable elastomers. For example, in a one-component system, the modified polymer may be end-blocked with groups which are hydrolyzable in ambient moisture. Silanes of the general formula $X_{4-m}SiY_m$ wherein X is a relatively unreactive group, such as alkyl, alkoxy, or aryl; Y is acyloxy, oximo, alkoxy, aryloxy, halogen, aminooxy, or phosphato groups; and $m$ is an integer of from 3 to 4, are added as end-blocking agents to hydroxyl-terminated modified organopolysiloxanes, thereby replacing the hydroxyl groups with functional groups of the type $OSiX_{4-m}Y_{m-1}$. Examples of these silanes are methyltriacetoxysilane, isopropyltriacetoxysilane, isopropoxytriacetoxysilane, methyltriacetoximosilane, methyltrisdiethylaminooxysilane, methyltris(diethylphosphato)silane, and the like.

Generally, the end-blocking agent is added to the modified organopolysiloxanes immediately after their formation while the same are still hot or at least warm. Under these conditions, the terminal hydroxyl groups carried by the modiled organopolysiloxanes are converted to functional groups which are hydrolyzable in ambient moisture. These compositions may be cured by merely exposing them to atmospheric moisture with or without any additional water vapor. Upon exposure to moisture, the compositions are cured at times varying from a few minutes to several hours or days.

In the two-component system, hydroxyl-terminated modified organopolysiloxanes are mixed with cross-linking agents, such as polyalkoxysilanes of the formula $(R^aO)_nSiR^b_{4-n}$ or polyalkoxysiloxanes in which the silicon atoms are linked through Si—O—Si linkages and the remaining valences of the silicon atom are satisfied by $R^aO$ and $R^b$. In the above formula, the groups represented by $R^a$ are monovalent hydrocarbon radicals having less than 8 carbon atoms, while those represented by $R^b$ are monovalent hydrocarbon radicals or halogenated monovalent hydrocarbon radicals of less than 8 carbon atoms, and $n$ has a value of from 3 to 4. Examples of monovalent hydrocarbon radicals represented by $R^a$ are methyl, ethyl, propyl, butyl, hexyl, octyl, phenyl, vinyl, allyl, ethylallyl, butadienyl, and the like. Radicals represented by $R^b$ may be the same as the radicals represented by $R^a$ above, as well as corresponding halogenated groups, such as chloromethyl, 2-bromo-4,6-diiodophenyl, 1,2-difluorovinyl, 3,4-difluorocyclopentyl, 2-bromocyclopentene-2,3-yl, and 6-chlorohexyl. The polyalkoxysilanes used herein include mono-organotrihydrocarbonoxysilanes, tetrahydrcarbonoxysilanes, alkyl silicates, and partial hydrolyzates of such silanes. The polyalkoxy compounds, e.g., ethyl orthosilicate or partially hydrolyzed ethyl silicates, such as ethyl silicate "40" which consists primarily of decaethyl tetrasilicate, are representative examples of these compounds. Other operative alkyl silicates are ethyltrimethoxysilane, methylbutoxydiethoxysilane, propyltripropoxysilane, methyltriethoxysilane, ethyltriethoxysilane, ethyl orthosilicate, and butyl orthosilicate. Examples of alkyl polysilicates are ethyl polysilicate, isopropyl polysilicate, butyl polysilicate, dimethyltetraethoxydisiloxane, trimethylpentabutoxytrisiloxane, and the like.

The polyalkoxysilanes and polyalkoxysiloxanes employed herein may be used either alone or in combination. They should be used in a proportion of from about 0.5 to about 20 percent or preferably from about 1 to 10 percent by weight based on the weight of the organopolysiloxane. If the total weight of the polyalkoxysilanes or polyalkoxysiloxanes employed is below about 0.5 percent based on the weight of the modified organopolysiloxanes, very little cross-linking occurs. If, on the other hand, the total weight of the polyalkoxysilanes or polyalkoxysiloxanes is above 10 percent based on the weight of the modified organopolysiloxanes, the cure time will not be substantially reduced.

The modified organopolysiloxane compositions are cured by mixing the hydroxyl-terminated organopolysiloxanes with the polyalkoxysilanes or the polyalkoxysiloxanes in the presence of a catalyst, preferably a metallic salt or compound. The metallic component of the catalyst is preferably tin, but may be lead, chromium, antimony, iron, cadmium, barium, calcium, titanium, bismuth, or magnesium. Examples of suitable salts are tin naphthenate, lead octoate, tin octoate, iron stearate, tin oleate, antimony octoate, tin butyrate, and the like. Other catalysts which may be used are bis(dibutylphenyltin) oxide, bis(acetoxydibutyltin) oxide, bis(tributyltin) oxide, dibutoxydibutyltin, tri-t-butyltin hydroxide, triethyltin hydroxide, diamyldipropoxytin, dioctyltin dilaurate, diphenyloctyltin acetate, dodecyldiethyltin acetate, trioctyltin acetate, triphenyltin acetate, triphenyltin laurate, triphenyltin methacrylate, dibutyltin butoxychloride, and the like. These catalysts may be dispersed in the solvent and then added to the hydroxyl-terminated modified organopolysiloxanes or they may be dispersed on a suitable filler or additive and thereafter milled with a modified polymer. Examples of suitable hydrocarbon solvents are benzene, toluene, xylene, and the like. Also, halogenated hydrocarbons, such as tetrachloroethylene or chlorobenzenes; organic ethers, such as diethyl ether, dibutyl ether, and the like; or fluid hydroxyl-free polysiloxanes, may be used as solvents. It is preferred that the solvent used for dispersing the catalyst be the same or at least miscible with the solvent used in the formation of the modified organopolysiloxanes. Also, the solvent should be sufficiently volatile to evaporate at room temperature.

These organopolysiloxanes may be compounded in the usual manner for preparing conventional siloxane elastomers. However, when the materials are stored prior to use, it is essential that either the catalyst or cross-linking agent, such as the polyalkoxysilanes or polyalkoxysiloxanes, be stored separately. In other words, the hydroxyl-terminated modified organopolysiloxanes, cross-linking agent, and filler, if desired, may be compounded and the catalyst added just prior to use. In another method, the amount of the organopolysiloxane, catalyst, and filler, if desired, may be compounded and a cross-linking agent added just prior to use. Where an inert filler is used, it may be added to either the hydroxyl-terminated modified organopolysiloxane or the cross-linking agent prior to the addition of the catalyst or immediately after the reactants have been combined. These compositions cure spontaneously at room temperature after the ingredients are mixed. The amount of catalyst used in these curing systems may range from 0.05 to about 2 percent by weight, preferably from about 0.1 to about 1 percent by weight based on the weight of the composition. A mixture of two or more of the catalysts mentioned above may be used if desired. The amount of catalyst added to the composition is determined by the requirements of the particular job, especially the pot life or working time required. For example, in caulking a working time of one to two hours is required, thus an amount of catalyst is added that will not result in any substantial stiffening of the caulking composition in a shorter time. Normally, the composition is tack-free within two to four hours following the caulking operation and substantially cured after about 24 hours and completely cured after about 7 days. The period of time may vary somewhat with changes in humidity and temperature.

Although not essential, fillers may be incorporated in these modified organopolysiloxane compositions. Examples of suitable fillers are fumed silicas, high-surface-area precipitated silicas, and silica aerogels, as well as coarser silicas, such as diatomaceous earth, crushed quartz, and the like. Other fillers which may be used are metallic oxides, such as titanium oxide, ferric oxide, zinc oxide; fibrous fillers, such as asbestos, fibrous glass, and the like. Additives, such as pigments, antioxidants, ultraviolet absorbers, and the like, may be included in these compositions.

The room-temperature-curable modified organopolysiloxanes prepared in accordance with this invention may be used as sealants in many applications. Generally, it is necessary to apply a primer to a substrate prior to the application of an organopolysiloxane sealant. Surprisingly, the modified organopolysiloxanes of this invention have self-priming properties; consequently, it is no longer necessary to use a primer in order to obtain good adhesion. This is of commercial significance, since it eliminates both the expense and time necessary for applying the primer prior to the application of the sealant composition.

Various embodiments of this invention are further illustrated by the following examples in which all parts are by weight unless otherwise specified.

EXAMPLE 1

To a reactor were introduced 62.5 parts of styrene, 179.4 parts of butyl acrylate, 162.1 parts of hydroxyl-terminated polydimethylsiloxane, 1.2 parts of di-t-butyl peroxide and 21.3 parts of toluene. The reactor was purged with nitrogen and the reactants were heated to 130±2° C. for 4 hours with agitation.

The above example was repeated except that varying amounts of toluene were used. The conversion of monomers was at least 90 percent in each case. The reaction products were removed from the reactor and the viscosity of each product was determined with a Brookfield viscometer (Model LVT, number 4 spindle). These products are clearly thixotropic as shown by the change of viscosity with stirring rate.

FIG. 1 graphically illustrates the thixotropic properties of the modified organopolysiloxane compositions prepared in a solvent system compared with a modified organopolysiloxane prepared in the absence of a solvent.

EXAMPLE 2

(a) To a reactor were introduced 62.5 parts of styrene, 179.4 parts of butyl acrylate, 162.1 parts of hydroxyl-terminated polydimethylsiloxane, 1.2 parts of di-t-butyl peroxide and 21.3 parts of toluene. The reactor was purged with nitrogen and the reactants were heated to 130±2° C. for 4 hours with agitation.

(b) For purposes of comparison, the above example was repeated except that 40.5 parts of toluene was used.

(c) For purposes of comparison, Example 2(a) was repeated except that 61 parts of toluene was used.

(d) Example 2(a) above was repeated except that 81 parts of toluene was used.

(e) For purposes of comparison, Example 2(a) above was repeated with the exception that no solvent was used in the reaction.

About 100 parts of each of the modified organopolysiloxane compositions prepared above was mixed with 5 parts of methyltriacetoxysilane and poured into a mold and cured at room temperature at a relative humidity of from 30 to 70 percent for 7 days. The modified organopolysiloxanes prepared in a solvent system all showed an improvement in the percent elongation as illustrated in Table I.

TABLE I

| Example No. | Toluene, percent | Physical properties | | | |
| --- | --- | --- | --- | --- | --- |
| | | Tensile strength, p.s.i. | Elongation, percent | Tear strength, lb./in. | Shore A hardness |
| 2(a) | 5 | 54 | 471 | 13 | 13 |
| 2(b) | 10 | 59 | 485 | 15 | 16 |
| 2(c) | 15 | 43 | 348 | 11 | 27 |
| 2(d) | 20 | 50 | 429 | 11 | 11 |
| 2(e) | 0 | 60 | 230 | 16 | 19 |

EXAMPLE 3

Each of the modified organopolysiloxanes prepared in accordance with the procedure described in Examples 2(a) to (e) was mixed with 5 parts of methyltriacetoxysilane and applied to previously cleaned and degreased substrates and cured at room temperature at a relative humidity of 30 to 70 percent for 7 days. The adhesion tests illustrated in Table II show that modified organopolysiloxanes prepared in a solvent system have improved adhesion properties.

TABLE II

| Example No. | Toluene, percent | Adhesion | | | |
| --- | --- | --- | --- | --- | --- |
| | | Glass | Plastic tile | Aluminum | Stainless steel |
| 3(a) | 5 | Excellent | Poor | Good | Fair. |
| 3(b) | 10 | do | Fair | do | Do. |
| 3(c) | 15 | do | do | do | Good. |
| 3(d) | 20 | do | Good | Excellent | Do. |
| 3(e) | 0 | do | None | Poor | Poor. |

EXAMPLE 4

(a) About 100 parts of the organopolysiloxane composition prepared in accordance with the procedure described in Example 3(d) was mixed with about 5 parts of methyltriacetoxysilane and applied to previously cleaned and degreased substrates. The composition was cured at room temperature at a relative humidity of from 30 to 70 percent for 7 days, then immersed in distilled water for 7 days and tested in accordance with the procedure described in Federal Specification TT–S–230a, 4.3.9.

(b) In a similar example, the organopolysiloxane composition prepared in accordance with the procedure described in Example 3(d) was admixed with about 5 parts of methyltriacetoxysilane and about 10 parts of Hi-Sil 233 and applied to previously cleaned and degreased substrates. The composition was cured and tested in accordance with the procedure described above.

(c) In a similar experiment, 100 parts of the organopolysiloxane composition prepared in accordance with the procedure described in Example 3(e) was mixed with about 5 parts of methyl-triacetoxysilane and applied to previously cleaned and degreased substrates. The composition was cured at room temperature at a relative humidity of from 30 to 70 percent for 7 days, then immersed in distilled water for 7 days and tested in accordance with the procedure described in Federal Specification TT–S–230a, 4.3.9.

The results of these examples are illustrated in Table III in which the organopolysiloxanes prepared in a solvent system show improved adhesion on aluminum substrates.

TABLE III

| Example No. | Toluene, percent | Filler Type | Parts | Adhesion in peel, p.s.i. Glass | Aluminum |
|---|---|---|---|---|---|
| 4(a) | 20 | | | 11.4 | 12.0 |
| 4(b) | 20 | HI-SIL 233 | 10 | 13.0 | 14.0 |
| 4(c) | 0 | | | 11.4 | 6.8 |

NOTE.—HI-SIL 233 = a precipitated silica.

EXAMPLE 5

(a) To a reactor were introduced about 208 parts of styrene, about 800 parts of ethyl acrylate, about 671 parts of hydroxyl-terminated polydimethylsiloxane, 20.1 parts of t-butyl peroctoate and 721 parts of toluene. The reactor was purged with nitrogen and the reactants heated to about 80° C. for a period of about 2 hours with agitation.

(b) The above example was repeated except that the reaction was conducted in the absence of toluene. Also, 2.08 grams of 1,1-di-t-butylperoxy-3,3,5-trimethylcyclohexane in dibutyl phthalate was substituted for t-butyl peroctoate. The reaction was extremely difficult to control and the temperature rose to about 100° C.

(c) A portion of the product prepared in Example 5(b) was then dissolved in sufficient toluene to form a 30 percent solution.

Approximately 100 parts of each of the above modified organopolysiloxane compositions was mixed with about 5 parts of methyltriacetoxysilane and applied to previously cleaned and degreased substrates. The compositions were cured for 7 days at a relative humidity of 30 to 70 percent. The results are illustrated in Table IV in which the modified organopolysiloxane prepared in a solvent system [5(a)] shows improved adhesion to various substrates.

TABLE IV

| Example No. | Toluene, percent | Adhesion Glass | Aluminum | Stainless steel | Concrete |
|---|---|---|---|---|---|
| 5(a) | 30 | Excellent | Good | Good | Excellent. |
| 5(b) | 0 | Good | Fair | Poor | Fair. |
| 5(c) | 30 | do | do | do | Do. |

Approximately 100 parts of each of the organopolysiloxanes prepared in Examples 5(a) and (b) was mixed with 5 parts of methyltriacetoxysilane and poured into a mold and cured at room temperature at a relative humidity of from 30 to 70 percent for 7 days. The cured samples are removed and the physical properties evaluated. The results are illustrated in Table V in which the modified organopolysiloxanes show an improvement in the percent elongation.

TABLE V

| Example No. | Toluene, percent | Physical properties Elongation, percent | Tear strength, lb./in. | Shore A hardness | Tensile, p.s.i. |
|---|---|---|---|---|---|
| 5(a) | 30 | 674 | 22 | 32 | 135 |
| 5(b) | 0 | 644 | 55 | 38 | 489 |

EXAMPLE 6

(a) To a reactor were introduced 100 parts of styrene, 185 parts of butyl acrylate, 122 parts of hydroxyl-terminated polydimethylsiloxane (400 cs.), 2.85 parts of t-butyl peroctoate and 102.5 parts of benzene. The reactor was purged with nitrogen and the reactants heated to about 80° C. for about 4 hours with agitation.

(b) The above example was repeated except that the reaction was conducted in the absence of benzene.

(c) The above example was repeated except that 125 parts of styrene, 154 parts of butyl acrylate, 2.79 parts of t-butyl peroctoate and 100.2 parts of benzene were added to about 119 parts of hydroxyl-terminated polydimethylsiloxane (4,000 cs.).

(d) Example 6(c) above was repeated except that the reaction was conducted in the absence of benzene.

About 100 parts of each of the modified organopolysiloxane compositions prepared above was mixed with about 5 parts of methyltriacetoxysilane and applied to previously cleaned and degreased substrates and cured at ambient temperature at a relative humidity of 30 to 70 percent. The results illustrated in Table VI show that the modified organopolysiloxanes prepared in a solvent system exhibit improved adhesion over those prepared in the absence of a solvent.

TABLE VI

| Example No. | S[1]:BA[2] | Benzene, percent | Adhesion Glass | Aluminum | Stainless steel | Concrete |
|---|---|---|---|---|---|---|
| 6(a) | 40:60 | 20 | Good | Good | Good | Excellent. |
| 6(b) | 40:60 | 0 | Poor | Poor | None | Poor. |
| 6(c) | 50:50 | 20 | Good | Good | Good | Good. |
| 6(d) | 50:50 | 0 | Poor | Poor | None | Poor. |

[1] Styrene. [2] Butyl acrylate.

EXAMPLE 7

In a similar experiment, 62.5 parts of styrene, 166.6 parts of butyl acrylate, about 10.5 parts of 4-vinylpyridine, and 2.4 parts of di-t-butyl peroxide were added to a reactor containing 159.8 parts of hydroxyl-terminated polydimethylsiloxane and 100.4 parts of toluene. The reactor was flushed with nitrogen and the reactants refluxed for 4 hours with agitation.

About 100 parts of the reaction mass prepared above was mixed with about 5 parts of methyltriacetoxysilane and poured into a mold and cured at ambient temperature at a relative humidity of from 30 to 70 percent for 14 days. The cured samples were removed and found to have the following physical properties:

Tensile, p.s.i. _____ 171
Elongation, percent _____ 535
Tear strength, lb./in. _____ 29
Shore A hardness _____ 35

EXAMPLE 8

To a 12-liter reactor equipped with a reflux condenser were added 1093 grams of styrene, 2499 grams of butyl acrylate, 2418 grams of hydroxyl-terminated polydimethylsiloxane, 35.9 grams of di-t-butyl peroxide, and 1511 grams of toluene. The reactor was purged with nitrogen and heated in an oil bath maintained at 132° C. From the combined effects of the external oil bath and the internal heat of reaction, the temperature of the reactants rose to 128° C., at which point the toluene refluxed steadily. The reaction temperature was thus maintained throughout at 128° C. for 3 hours despite the evolution of heat, without any external cooling other than the condenser.

In a similar experiment conducted in the absence of toluene, the reaction proceeded at such a rapid rate that, even with auxiliary cooling, there was a rapid rise in temperature to over 200° C. and consequent loss of monomers from the system and extremely low conversion.

EXAMPLE 9

To a 22-liter reactor equipped with a reflux condenser were added 1820 grams of styrene, 4160 grams of butyl acrylate, 3987 grams of hydroxyl-terminated polydimethylsiloxane, 59.8 grams of di-t-butyl peroxide, and 2492 grams of toluene. The reactor was purged with nitrogen and heated as in Example 8 for 4 hours with agitation. As the toluene refluxed, the reaction temperature remained constant between 125° and 129.5° C. throughout the reaction period without auxiliary cooling.

Although the present invention has been defined with specific reference to the above examples, it should be understood that these examples were given merely for purposes of illustration. Other variations which will become apparent to those skilled in the art are to be included within the scope of this invention.

The invention claimed is:

1. A method for preparing a curable modified organopolysiloxane composition with thioxotropic and self-priming properties which consists essentially of contacting an organopolysiloxane in which the organo groups connected to the silicon atoms are monovalent hydrocarbon radicals, halogenated monovalent hydrocarbon radicals and cyanoalkyl radicals and having terminal groups selected from the class consisting of hydroxyl, amino, amido, aminooxy, oximo, halogen, aryloxy, acyloxy, alkoxy and phosphato groups with an olefinic organic compound selected from the class consisting of branched and straight chained olefins whether or not attached to an aromatic nucleus, halogenated olefins, again whether or not attached to an aromatic nucleus, unsaturated acids, esters of organic acids in which either the esterifying group or the derivative acid is unsaturated, unsaturated amides and unsaturated nitriles in the presence of a free-radical initiator and from 2 to 50 percent by weight based on the weight of the composition of an inert organic solvent having a relatively low chain-transfer constant and a boiling range of from about 50° C. to 160° C., said solvent is selected from the group consisting of aromatic hydrocarbons, chlorinated aromatic hydrocarbons, aliphatic hydrocarbons, cycloaliphatic hydrocarbons and saturated monocarboxylic acid esters, the resulting modified organopolysiloxane having at least one polymeric organic side chain connected to a silicon atom through a carbon-to-carbon linkage.

2. The method of claim 1 wherein the reactants are maintained at the reflux temperature.

3. The method of claim 1 wherein the modified organopolysiloxane may be represented by the formula:

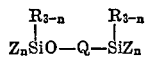

wherein R is a monovalent hydrocarbon radical; Q represents a siloxane radical of the formula:

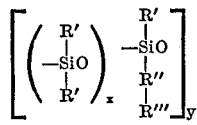

in which R' is selected from the class consisting of monovalent hydrocarbon radicals, halogenated monovalent radicals, and cyanoalkyl radicals; R" is a divalent hydrocarbon radical; R''' is a polymeric group linked to R" by a carbon-to-carbon linkage; said polymeric group being constituted of recurring units derived from monomers containing ethylenic unsaturation, said monomers being selected from the class consisting of branched and straight chained olefins whether or not attached to an aromatic nucleus, halogenated olefins, again whether or not attached to an aromatic nucleus, unsaturated acids, esters of organic acids in which either the esterifying group or the derivative acid is unsaturated, unsaturated amides and unsaturated nitriles; Z is selected from the class consisting of hydroxyl, amino, amido, aminooxy, oximo, halogen, aryloxy, acyloxy, alkoxy and phosphato groups; $n$ is an integer of from 1 to 3; $x$ is an integer of from 0 to 20,000; and $y$ is an integer of from 1 to 500.

4. The method of claim 1 wherein the initial organopolysiloxane is represented by the formula:

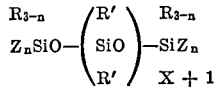

wherein R is a monovalent hydrocarbon radical; R' is selected from the class consisting of monovalent hydrocarbon radicals; halogenated monovalent hydrocarbon radicals, and cyanoalkyl radicals; Z is selected from the class consisting of hydroxyl, amino, amido, aminooxy, oximo, halogen, aryloxy, acyloxy, alkoxy and phosphato group; $n$ is an integer of from 1 to 3; and $x$ is an integer of from 0 to 20,000.

5. The method of claim 4 wherein Z represents hydroxyl groups.

6. A modified organopolysiloxane composition consisting essentially of an organopolysiloxane in which the organo groups connected to the silicon atoms are monovalent hydrocarbon radicals, halogenated monovalent hydrocarbon radicals and cyanoalkyl radicals and having terminal groups seelcted from the class consisting of hydroxyl, amino, amido, aminooxy, oximo, halogen, aryloxy, acyloxy, alkoxy and phosphato groups, and having at least one polymeric organic side chain linked to said organopolysiloxane through a carbon-to-carbon linkage, said polymeric side chain being constituted of recurring units derived from monomers containing ethylenic unsaturation, said monomers being selected from the class consisting of branched and straight chained olefins whether or not attached to an aromatic nucleus, halogenated olefins, again whether or not attached to an aromatic nucleus, unsaturated acids, esters of organic acids in which either the esterifying group or the derivative acids is unsaturated, unsaturated amides and unsaturated nitriles; said composition obtained by reacting an olefinic organic compound selected from the class consisting of branched and straight chained olefins whether or not attached to an aromatic nucleus, halogenated olefins, again whether or not attached to an aromatic nucleus, unsaturated acids, esters of organic acids in which either the esterifying group or the derivative acid is unsaturated, unsaturated amides and unsaturated nitriles, with an organopolysiloxane in the presence of a free-radical initiator and from 2 to 50 percent by weight based on the weight of the composition of an inert organic solvent having a relatively low chain-transfer constant and a boiling range of from 50° C. to 160° C., said solvent is selected from the group consisting of aromatic hydrocarbons, chlorinated aromatic hydrocarbons, aliphatic hydrocarbons, cycloaliphatic hydrocarbons and saturated monocarboxylic acid esters.

7. The composition of claim 6 wherein the composition contains particulate matter, said particulate matter is generated in situ by contacting the organopolysiloxane with an organic monomer containing ethylenic unsaturation in the presence of a free-radical initiator and from 2 to 50 percent by weight of an inert organic solvent boiling at a temperature of from 50° C. to 160° C., said solvent is selected from the group consisting of aromatic hydrocarbon, chlorinated aromatic hydrocarbons, aliphatic hydrocarbons, cycloaliphatic hydrocarbons and esters.

8. The composition of claim 6 wherein the modified organopolysiloxane may be represented by the formula:

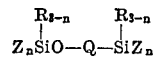

wherein R is a monovalent hydrocarbon radical; Q represents a siloxane radical of the formula:

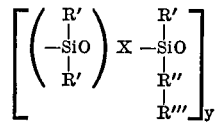

in which R' is selected from the class consisting of monovalent hydrocarbon radicals, halogenated monovalent hydrocarbon radicals, and cyanoalkyl radicals; R" is a divalent hydrocarbon radical; R''' is a polymeric group being constituted of recurring units selected from the class consisting of branched and straight chained olefins whether or not attached to an aromatic nucleus, halogenated olefins, again whether or not attached to an aromatic nucleus, unsaturated acids, esters of organic acids in which either the esterifying group or the derivative acid is unsaturated, unsaturated amides and unsaturated nitriles; Z is selected from the class consisting of hydroxyl, amino, amido, aminooxy, oximo, halogen, aryloxy, acyloxy, alkoxy and phosphato groups; $n$ is an integer of from 1 to 3; $x$ is an integer of from 0 to 20,000; and $y$ is an integer of from 1 to 500.

9. A self-priming curable sealant composition comprising an organopolysiloxane in which the organo groups connected to the silicon atoms are monovalent hydrocarbon radicals, halogenated monovalent hydrocarbon radicals and cyanoalkyl radicals and having terminal groups selected from the class consisting of hydroxyl, amino, amido, acyloxy, aminooxy, oximo, halogen, aryloxy, alkoxy and phosphato groups and having at least one polymeric organic side chain linked to said organopolysiloxane through a carbon-to-carbon linkage; said polymeric group being constituted of recurring units derived from monomers containing ethylenic unsaturation, said monomers being selected from the class consisting of branched and straight chained olefins whether or not attached to an aromatic nucleus, halogenated olefins, again whether or not attached to an aromatic nucleus, unsaturated acids, esters of organic acids in which either the esterifying group or the derivative acid is unsaturated, unsaturated amides and unsaturated nitriles; said composition obtained by contacting said monomers with the organopolysiloxane in the presence of a free-radical initiator and from 2 to 50 percent by weight of an inert organic solvent having a relatively low chain-transfer constant and a boiling range of from about 50° C. to 160° C., said solvent is selected from the group consisting of aromatic hydrocarbons, chlorinated aromatic hydrocarbons, aliphatic hydrocarbons, cycloaliphatic hydrocarbons and saturated monocarboxylic acid esters.

10. The composition of claim 9 where the polymeric organic side chain is vinylpyridine.

11. The composition of claim 9 wherein the modified organopolysiloxane may be represented by the formula:

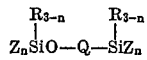

wherein R is a monovalent hydrocarbon radical; Q represents a siloxane radical of the formula:

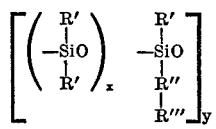

in which R' is selected from the class consisting of monovalent hydrocarbon radicals, halogenated monovalent hydrocarbon radicals and cyanoalkyl radicals; R'' is a divalent hydrocarbon radical; R''' is a polymeric group linked to R'' by a carbon-to-carbon linkage; said polymeric group being constituted of recurring units derived from monomers containing ethylenic unsaturation, said monomers being selected from the class consisting of branched and straight chained olefins whether or not attached to an aromatic nucleus, halogenated olefins, again whether or not attached to an aromatic nucleus, unsaturated acids, esters of organic acids in which either the esterifying group or the derivative acid is unsaturated, unsaturated amides and unsaturated nitriles; Z is selected from the class consisting of hydroxyl, amino, amido, aminooxy, oximo, halogen, aryloxy, acyloxy, alkoxy and phosphato groups; $n$ is an integer of from 1 to 3; $x$ is an integer of from 0 to 20,000; and $y$ is an integer of from 1 to 500.

12. The composition of claim 9 wherein the terminal groups are hydroxyl groups and the composition further contains a catalyst and a cross-linking agent selected from the class consisting of polyalkoxysilanes and polyalkoxysiloxanes.

13. The composition of claim 9 wherein the terminal groups are acyloxy groups and when exposed to atmospheric moisture cures to an elastomeric solid.

14. The composition of claim 9 wherein the terminal groups are aminooxy groups and when exposed to atmospheric moisture cures to an elastomeric solid.

15. The composition of claim 9 wherein the terminal groups are amino groups and when exposed to atmospheric moisture cures to an elastomeric solid.

References Cited
UNITED STATES PATENTS

| | | | |
|---|---|---|---|
| 3,661,816 | 5/1972 | Pepe et al. | 260—18 S |
| 2,959,569 | 11/1960 | Warrick | 260—448.2 E X |
| 3,531,424 | 9/1970 | Swanson | 260—827 X |
| 3,555,109 | 1/1971 | Getson | 260—827 X |

ALLAN LIEBERMAN, Primary Examiner

S. M. PERSON, Assistant Examiner

U.S. Cl. X.R.

260—33.6 SB, 33.8 SB, 46.5 UA, 827